| # United States Patent | [11] 3,630,610 |

| [72] | Inventor | William C. Klein |
| | | Rochester, N.Y. |
| [21] | Appl. No. | 66,300 |
| [22] | Filed | Aug. 24, 1970 |
| [45] | Patented | Dec. 28, 1971 |
| [73] | Assignee | Eastman Kodak Company |
| | | Rochester, N.Y. |

[54] COLOR FILTER MONITOR
13 Claims, 2 Drawing Figs.

[52] U.S. Cl. .................................................. 355/71,
250/226, 355/88, 356/186
[51] Int. Cl. ...................................................... G03b 27/76
[50] Field of Search........................................... 355/83, 88,
71; 250/226, 234; 356/186

[56] References Cited
UNITED STATES PATENTS
2,184,831  12/1939  Campbell..................... 355/71 X
2,243,047  5/1941  Foster et al. ................. 355/83
2,550,382  4/1951  Rouy............................. 250/226 X
3,267,808  8/1966  Czekalla et al. ............. 355/71 X

*Primary Examiner*—Samuel S. Matthews
*Assistant Examiner*—Richard M. Sheet
*Attorneys*—Robert W. Hampton and R. Lewis Gable ABSTRACT: The operative condition of an element such as a color filter employed in color printing apparatus is monitored by a sensing device that indicates when the element becomes inoperative. In a color printer, color filters are employed that are adapted to be moved from a rest position to a printing position in the path of the printing beam to affect the color composition of the printing beam. A sensing device is operative when the filter is moved into the rest position to detect a variance in the color transmission of the filter and alert the operator of the color printer of the variance.

WILLIAM C. KLEIN
INVENTOR.

BY R. Lewis Gable
Robert W. Hampton
ATTORNEYS

COLOR FILTER MONITOR

BACKGROUND OF THE INVENTION

1. Field of the Invention

This invention relates to photographic apparatus, and more particularly to apparatus for indicating when an element such as an optical filter becomes inoperative.

2. Description of the Prior Art

In subtractive color printers, for example, it is common practice to illuminate a color negative with red, green and blue primary color components from a white light source and to project an image of the illuminated negative in a printing beam onto a sheet of color print material. Three subtractive primary filters $f_c$ (cyan), $f_m$ (magenta) and $f_y$ (yellow) may be arranged to be selectively movable into and out of the printing beam of the projected image. The color composition of the projected image may be monitored by three photosensitive devices which are selectively responsive to the red, green and blue color components of the printing beam. Each of the photosensitive devices may be connected to a capacitance circuit which, under the influence of the output signal from the photosensitive device, charges to a predetermined voltage. As each capacitance charges to the predetermined voltage, a corresponding one of three subtractive primary filters is inserted into the printing beam. For example, after a time delay dependent upon the amount of red light striking the red-sensitive photosensitive device, the cyan filter $f_c$ is inserted into the printing beam to halt the red exposure of the sheet of color print material. Similarly the blue exposure of the sheet of color print material is halted when the yellow filter $f_y$ is inserted into the printing beam; and the green exposure is halted when the magenta filter $f_m$ is inserted into the printing beam. When all three filters are moved into the printing beam, the exposure is stopped, since, theoretically, all light is cut off from the printing beam by the filters; however, as a safeguard, an opaque shutter is usually inserted thereafter into the printing beam. A color printer of the type herebefore described is disclosed in U.S. Pat. No. 3,184,307 issued May 18, 1965, and assigned to Eastman Kodak Company.

The materials of the primary subtractive filters may be selected to, as nearly as possible, absorb only the light emitted by the white light source that has a selected bandwidth roughly corresponding to the red, green and blue primary color wavelengths. Filters of the complementary colors, cyan, magenta and yellow, absorb the red, green and blue color components, respectively, of the white light source. The magenta and yellow filters may consist of respective gelatin filter films mounted in glass, and the composite structure is relatively durable. However, since cyan gelatin filter films are not economical, the cyan filter is usually constructed from an extremely thin, dichroic glass which is susceptible to fatigue and breakage. Furthermore, the gelatin filter films and the dichroic glass are subject to fading by the intense light of the printing beam over a period of time, and their respective absorbencies are subject to change.

Color printers are relatively complex mechanically and, the subtractive primary filters are usually not disposed in direct view of the operator of the machine. Occasionally the relatively fragile cyan filter breaks and is not detected until the faulty prints are developed. At high-speed printing rates a great deal of photographic paper and operator's time may be lost before the broken filter is detected.

Also, it is necessary from time to time to check the color filters for deterioration of their absorbency characteristics due to fatigue and fading.

SUMMARY OF THE INVENTION

Accordingly, it is an object of the present invention to indicate the operative condition of an optical element in a photographic apparatus such as a printer.

It is also an object of the present invention to detect the breakage or fading of a color filter in a printing apparatus before the loss of photographic paper and the operator's time.

Another object of the invention is to alert the operator of a color printer when a color filter becomes inoperative due to breakage or fading.

It is also an object of the present invention to halt the operation of a color printer when a color filter breaks.

A preferred embodiment of the present invention is disclosed in connection with a printer which includes at least one color filter, and means for controllably moving the color filter between a rest position and a printing position. Means are provided for indicating the operative condition of the color filter when it is in the rest position. More particularly, in accordance with one preferred embodiment of the invention, a sensing device is responsive to the color component of light that is normally absorbed by the filter in the rest position for halting the operation of the color printer and alerting the operator thereof when a broken or faded color filter transmits the normally absorbed color component. The term light, as it is employed in the context of the specification and claims, may be defined as an electromagnetic radiation in the wavelength range including infrared, visible, ultraviolet and X-rays radiation and not limited to radiation in the visible wavelength spectrum.

In one illustrative embodiment of this invention, the sensing device may include a light source for emitting light of a frequency bandwidth that is the complement of the color component frequency bandwidth normally absorbed by the filter and a photoresponsive device responsive to the light emitted by the light source for producing an indication of an inoperative filter. The color filter, when in the rest position, substantially absorbs the frequency bandwidth of light emitted by the light source as long as it is in an operative condition. When the color filter becomes inoperative due to breakage or fading, a portion of the light is transmitted by the filter upon the photoresponsive device which produces an indication of the inoperative condition. Switching means responsive to the movement of the color filter to the rest position are provided for connecting the output of the photoresponsive device to further means for producing the indication. When the color filter is in the printing position, the switch is open and the output of the photoresponsive device is disconnected from the indicating means.

Other objects and advantages of the invention will become more apparent from the following description taken in conjunction with the accompanying drawings.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
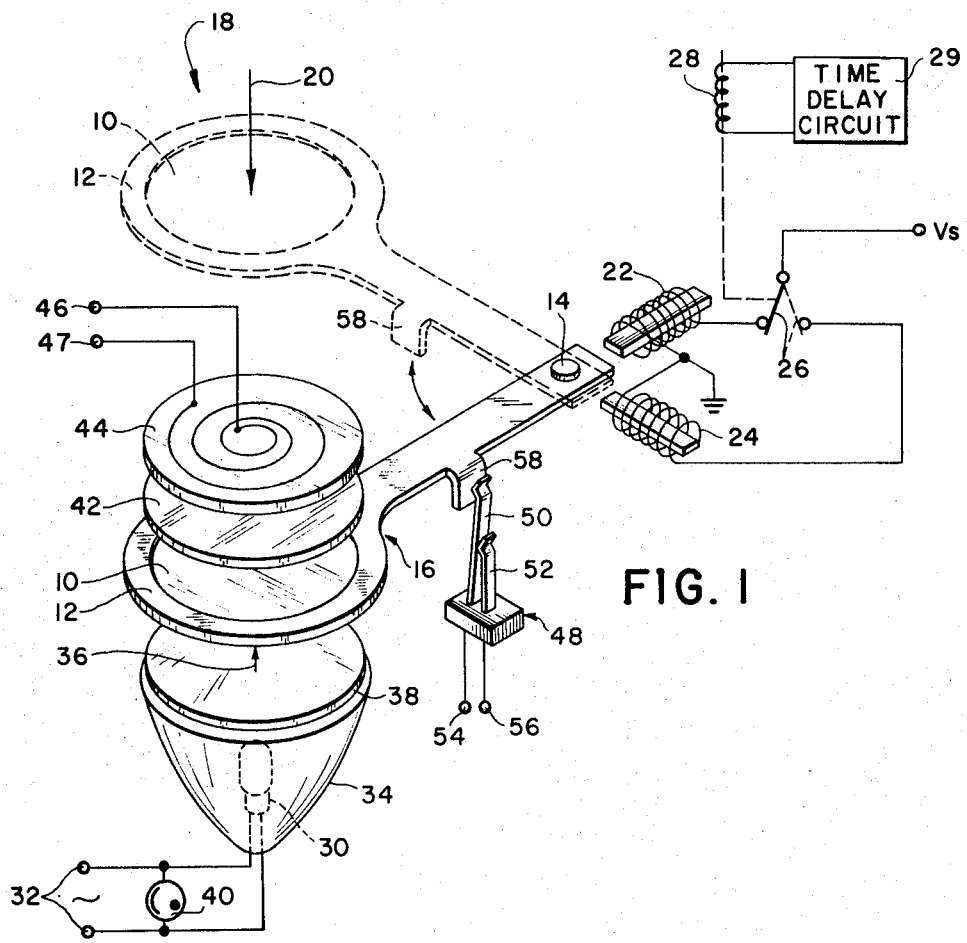
FIG. 1 is a schematic illustration in partial perspective of one embodiment of the sensing device in accordance with the invention.

Referring now to the drawings, and first to FIG. 1, a subtractive primary filter 10 is mounted in a filter holder 12 and is adapted to rotate about a suitable pivot 14 between a rest position depicted in solid lines at position 16 and a printing position depicted in dotted lines at 18. In the printing position 18, a printing light beam from a white light source (not shown), as indicated by arrow 20, passes through the filter 10 onto a sheet of color printing material (not shown) in the manner disclosed, for example, in the aforementioned U.S. Pat. No. 3,184,307.

The filter holder 12 may be pivoted between the rest position 16 and the printing position 18 by the energization of solenoids 22 and 24 which are selectively energized by a single-pole, double-throw switch 26 connected in an electric circuit with a voltage source $V_s$ and the solenoids 22 and 24. The contacts of the switch 26 are normally in the position depicted in FIG. 1 and the energization of the solenoid 22 thereby is effected to retain the filter holder in the rest position. The contacts of switch 26 may be actuated by a solenoid 28 in response to the charging of a capacitance time delay circuit 29 to a predetermined voltage in response to the detection by a photosensitive device (not shown) of a predetermined amount of a primary color in the printing beam as described hereinbefore.

The apparatus described with respect to FIG. 1 is known in the prior art of color printing and is, for example, similar to apparatus employed in the Model 2620 Color Printer marketed by Eastman Kodak Company, and further description of such apparatus is deemed unnecessary.

In accordance with the present invention, the operative condition of the color filter 10 is detected when the color filter 10 is moved from the printing position 18 to the rest position 16. The broken or faded filter is automatically detected in the rest position, and an audible or visible signal is generated to alert the operator of the breakage or fading of the filter.

This condition is detected by a sensing means which in accordance with the embodiment of the invention shown in FIG. 1 includes a lamp 30 energized at terminals 32 by the power supply $V_s$. Lamp 30 emits light that is reflected by a parabolic reflector 34 in the direction of the arrow 36 through a light source filter 38 which absorbs all wavelengths of light emitted by the light source 30 except that bandwidth of light that is normally absorbed by the primary subtractive filter 10. Therefore, the absorption spectrum of the color filter 38 is complementary to the absorption spectrum of the subtractive primary filter 10. A neon bulb 40 is connected between the power supply terminal 32 and the lamp 30 and may be mounted on the control panel of the color printer to alert the operator if the light source 30 fails.

The filtered light indicated by the arrow 36 is normally absorbed by the primary subtractive filter 10 as long as the filter is intact and not faded. If the filter is faded or broken in any part, at least a portion of the light 36 will pass through the primary subtractive filter 10 and a directional filter 42 and strike the surface of the photoresponsive device 44. The directional filter 42 passes only light which is substantially perpendicular to its planar surface. The filter 42 is desirable because the primary subtractive filter 10 consists of a dichroic glass that absorbs only near perpendicular incident light in accordance with its absorption spectrum. The filter 42 prevents oblique rays of light passing through the primary subtractive filter from striking the surface of the photoresponsive device 44. The photoresponsive device 44 may comprise a photovoltaic cell that generates a current at its output terminals 46, 47 proportional to the light striking the surface of the photocell.

As stated hereinbefore, the dichroic filter employed in color printers is normally the cyan filter that absorbs light in the red color wavelengths. Therefore, the light source filter 38 should be a red filter that absorbs all wavelengths of light emitted by the light source 30 except the red color wavelengths, and, if the cyan filter 10 is intact and not faded, and in its rest position 16, the photovoltaic cell 44 will generate little current. To prevent the photovoltaic cell 44 from generating any current when the filter holder 12 is in the printing position 18, a switch 48 having spring contacts 50 and 52 and terminals 54 and 56 is provided to be engaged by a projection 58 on the filter holder 12. As shown in FIG. 1, the switch contacts are closed by the depression of spring contact 50 by the projection 58 when the filter 10 is in the rest position 16. However, when the filter 10 is rotated to the printing position 18, the switch contacts 50 and 52 are reopened. The switch 48 is connected between the output terminals 46, 47 of the photovoltaic cell and the indicating circuitry as shown and described in detail in FIG. 2.

Figure 2:
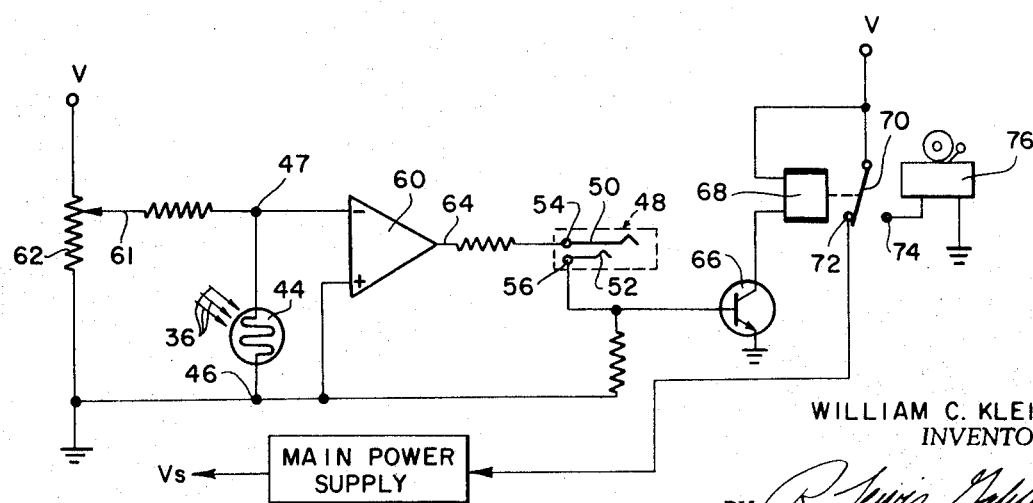
FIG. 2 is a schematic illustration in block form of an indication circuit employed in connection with the embodiment of FIG. 1.

Referring to FIG. 2, there is shown a circuit which may be employed in connection with the apparatus shown in FIG. 1 to produce an alarm and halt the operation of the color printing machine in response to the detection of a broken or faded color filter. The output terminals 46, 47 of photovoltaic cell 44 are connected to a point of common potential such as ground and an input terminal of an operational amplifier 60, respectively. A variable reference potential determined by the setting of the movable contact arm 61 of rheostat 62 is applied across the output terminals 46 of the photovoltaic cell 44. The rheostat 62 is adjusted to vary the sensitivity of the photovoltaic cell 44 as explained hereafter.

In the absence of any light striking the photovoltaic cell 44, the potential at contact arm 61 is applied to the input terminals of the operational amplifier 60 which may be arranged to operate without feedback at maximum gain. The operational amplifier 60 inverts the polarity of the applied potential to develop at its output terminal 64 of a negative polarity signal. The negative polarity signal is applied through the contacts 50 and 52 (which are closed by action of the projection 58 of FIG. 1) of the switch 48 to the base electrode of switching transistor 66. The switching transistor 66 is reverse biased by the negative polarity voltage applied at its base terminal and is rendered nonconductive thereby.

When, however, light strikes the surface of the photovoltaic cell 44, the cell generates a current proportional to the light falling upon it and develops a potential that is opposite in polarity to the reference potential of the contact arm 61. When the developed potential exceeds the reference potential, the output signal appearing at terminal 64 of the operational amplifier 60 changes from a negative polarity signal to a positive polarity signal. If a broken, faded filter 10 is in the rest position, the switch contacts 50 and 52 of switch 48 are closed by the action of the projection 58 on the filter holder 12 of FIG. 1. The positive polarity signal developed by the operational amplifier 60 is therefore applied by the switch contacts 50 and 52 of the switch 48 to the base terminal of the switching transistor 66.

The positive polarity applied at the base electrode of the switching transistor 66 is effective to render the transistor 66 fully conductive and to thereby allow current to flow from the voltage source +V through the relay coil 68 to ground. In the absence of any current flowing through the relay coil 68, the movable contact of a relay switch 70 engages a fixed contact 72, as depicted in FIG. 2, thereby connecting voltage source +V to the color printer supply. However, when current passes through the relay coil 68, the movable contact of relay switch 70 engages a fixed contact 74, and the voltage source +V is connected to the terminals of an indicator which, as depicted, may take the form of an alarm bell 76. Thereafter, the voltage supply is disconnected from the color printer, and the operation of the color printer is halted. The alarm bell 76 is energized to alert the operator of the fact that the filter has broken or become faded. The alarm bell 76 continues to ring until it is manually reset and the filter 10 is changed. Since the color printer supply voltage has been interrupted, the filter holder 12 cannot be rotated out of the rest position until the supply voltage is restored.

From the description of the preferred embodiment set forth above, it is apparent that the invention can be practiced in many alternative ways. It is apparent that the invention may be practiced in substantially the same manner as disclosed in the preferred embodiment by the employment of FIG. 1 of any light source filter 38 that has a wavelength absorption in the visible or invisible frequency spectrum that is complementary to that of the filter 10. Therefore, the invention may be practiced with respect to any color filter 10, whether it is subtractive or additive in nature or absorbs only ultraviolet or infrared light.

Also, it is apparent that the alarm triggered by the detection of the broken filter may be audio or visual or any combination of the two, and the color printer supply may or may not be interrupted in the manner shown.

As may be seen, a novel system has been disclosed for detecting inoperative color filters employed in subtractive or additive color printers immediately after the breakage of the filter, thus eliminating the loss of a great deal of photographic paper and operator's time.

The invention has been described in detail with particular reference to preferred embodiments thereof, but it will be understood that variations and modifications can be effected within the spirit and scope of the invention.

I claim

1. In a color printer comprising in combination at least one color filter movable between a first position remote from a printing beam of the color printer and a second position wherein said color filter is disposed to intercept the printing beam and to absorb a predetermined bandwidth of the frequency spectrum of light in said printing beam, the improvement comprising:
   a. means for monitoring the absorbency characteristics of said color filter when said color filter is in said first position and for producing a signal upon failure of said color filter to absorb said predetermined bandwidth of light; and
   b. means responsive to said signal for producing an indication of the failure of said color filter.

2. In a color printer as claimed in claim 1 wherein said monitoring means comprises:
   a. means for providing a beam of light having a frequency spectrum within said predetermined bandwidth and for directing said beam of light in a predetermined path intercepted by one surface of said color filter when said color filter is disposed in said first position; and
   b. photoresponsive means located in said predetermined path adjacent the opposite surface of said color filter for detecting the transmission of said beam of light through said filter when said filter has failed to absorb said predetermined bandwidth of light and for providing said signal indicative of the degree of transmission of said predetermined bandwidth of light by said color filter.

3. In a color printer as claimed in claim 2 wherein said monitoring means is operative to detect the transmission of said predetermined bandwidth of light through said filter when said filter is broken.

4. In a color printer as claimed in claim 2 wherein said monitoring means is operative to detect the transmission of said predetermined width of light through said filter when said filter is faded.

5. In a color printer comprising in combination at least one color filter movable between a first position remote from a printing beam of the color printer and a second position wherein said color filter is disposed to intercept the printing beam and to absorb a predetermined bandwidth of the frequency spectrum of light in said printing beam, the improvement comprising:
   a. means for monitoring the absorbency characteristics of said color filter when said color filter is in said first position and for producing a signal upon failure of said color filter to absorb said predetermined bandwidth of light;
   b. means, including an input terminal adapted to receive said signal, for producing an indication in response to said signal of the failure of said color filter; and
   c. a switch responsive to the movement of said color filter to said first position for connecting said signal producing means to said input terminal and responsive to the movement of said color filter from said first position for disconnecting said signal producing means from said input terminal.

6. In a color printer as claimed in claim 5, wherein monitoring means comprises:
   a. means for providing a beam of light having a frequency spectrum within said predetermined bandwidth and for directing said beam of light in a predetermined path intercepted by one surface of said color filter when said color filter is disposed in said first position; and
   b. photoresponsive means located in said predetermined path adjacent the opposite surface of said color filter for detecting the transmission of said beam of light through said filter when said filter has failed to absorb said predetermined bandwidth of light and for providing said signal indicative of the degree of transmission of said predetermined bandwidth of light by said color filter.

7. In a color printer, apparatus for monitoring the absorbency characteristics of a color filter when said color filter is in a first position remote from a printing beam of the color filter, said apparatus comprising:
   a. a color filter having a primary absorbency of the frequency spectrum of light within a predetermined bandwidth;
   b. means for moving said color filter between said first position remote from said printing beam and a second position wherein the color filter is disposed to intercept the printing beam and to thereby absorb said predetermined bandwidth of light in said printing beam;
   c. means responsive to the movement of said color filter to said first position remote from said printing beam for monitoring the absorbency characteristics of said color filter and producing a signal upon the failure of said color filter to absorb said predetermined bandwidth of light; and
   d. means responsive to the production of said signal by said monitoring means when said color filter is disposed in said first position for producing an indication of the absorbency characteristic of said color filter.

8. The apparatus of claim 7 further comprising means responsive to the production of said signal by said monitoring means when said color filter is disposed in said first position for disabling the further operation of said color printer.

9. The apparatus of claim 7 wherein said monitoring means comprises:
   a. means for providing a beam of light having a frequency spectrum within said predetermined bandwidth and for directing said beam of light in a predetermined path intercepted by one surface of said color filter when said color filter is disposed in said rest position; and
   b. photoresponsive means located in said predetermined path adjacent the opposite surface of said color filter for detecting the transmission of said beam of light through said filter when said filter fails to absorb said predetermined bandwidth of light and for providing said signal indicative of the degree of transmission of said predetermined bandwidth of light by said color filter.

10. The apparatus of claim 9 wherein said monitoring means is operative to detect the transmission of said predetermined bandwidth of light through said filter when said filter is broken.

11. The apparatus of claim 9 wherein said monitoring means is operative to detect transmission of said predetermined bandwidth of light through said color filter when said color filter is faded.

12. In a color printer, apparatus for monitoring the absorbency characteristics of a color filter when said color filter is in a first position remote from a printing beam of the color printer, said apparatus comprising:
   a. means for providing a beam of light having a frequency spectrum within a predetermined bandwidth and for directing said beam of light in a predetermined path remote from said printing beam of said color printer;
   b. light responsive means located to intercept said predetermined path for producing a signal in response to said beam of light;
   c. a color filter having a primary absorbency of the frequency spectrum of light within said predetermined bandwidth;
   d. means for moving said color filter between a first position remote from said printing beam wherein said color filter is disposed to intercept said predetermined path and to thereby absorb said predetermined bandwidth of light in said beam of light and a second position wherein said color filter is disposed to intercept said printing beam and to thereby absorb said predetermined bandwidth of light in said printing beam; and e. means responsive to the production of said signal by said light responsive means when said color filter is disposed in said first position for producing an indication of the absorbency characteristic of said color filter.

13. The apparatus of claim 12 further comprising means responsive to the movement of said color filter from said first position for preventing the response of said indicating means to said signal.

* * * * *